(12) United States Patent
Herrmann et al.

(10) Patent No.: US 10,525,687 B2
(45) Date of Patent: Jan. 7, 2020

(54) DUAL PRESSURE SENSITIVE ADHESIVE SHEET FOR INSTORE SIGNAGE

(71) Applicant: XEROX CORPORATION, Norwalk, CT (US)

(72) Inventors: Douglas K Herrmann, Webster, NY (US); Erwin Ruiz, Rochester, NY (US); Paul M Fromm, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/947,953

(22) Filed: Apr. 9, 2018

(65) Prior Publication Data

US 2019/0308401 A1  Oct. 10, 2019

(51) Int. Cl.
*B32B 37/12* (2006.01)
*B05C 1/08* (2006.01)
*C09J 7/38* (2018.01)
*B05C 9/06* (2006.01)
*B29C 65/52* (2006.01)

(52) U.S. Cl.
CPC ........ *B32B 37/1292* (2013.01); *B05C 1/0813* (2013.01); *B05C 1/0821* (2013.01); *B05C 1/0834* (2013.01); *B05C 9/06* (2013.01); *B32B 37/1284* (2013.01); *C09J 7/38* (2018.01); *B29C 65/526* (2013.01); *B32B 2037/1253* (2013.01); *B32B 2405/00* (2013.01); *B32B 2590/00* (2013.01)

(58) Field of Classification Search
CPC ........... B32B 37/1292; B32B 37/1284; B32B 2405/00; B32B 2037/1253; B32B 2590/00; B05C 1/0834; B05C 1/0821; B05C 1/0813; B05C 9/06; B05C 9/12; B05C 9/14; C09J 7/38; B29C 65/526; B41S 5/04; B41S 5/06; B41S 5/24
USPC ......... 118/35, 37, 58, 66–68, 211, 221, 224, 118/244, 249, 255, 259; 156/578, 510, 156/548, 549
See application file for complete search history.

(56) References Cited

U.S. PATENT DOCUMENTS 6,718,908 B1 * 4/2004 Bayer .................. B05C 1/0834
101/229
2011/0186237 A1 * 8/2011 Lin .......................... B31F 1/07
156/549

\* cited by examiner

*Primary Examiner* — Laura Edwards

(57) ABSTRACT

A tandem system of metering and donor rolls is used to apply two different adhesives to a fully adhesive backed multilayer sheet to produce variably distributed adhesives and properties. Each of the two adhesives is unique and is cured differently to create a layer of adhesive that has differing adhesive properties on the sheet. A clear adhesive is applied to a top portion of cards before they are cut from the sheet and has a higher tackiness than the adhesive applied to the rest of the cards on the sheet in order to reduce glue buildup on blades cutting the cards from the sheet.

4 Claims, 3 Drawing Sheets

DUAL PRESSURE SENSITIVE ADHESIVE SHEET FOR INSTORE SIGNAGE

BACKGROUND

The present disclosure relates to an apparatus and method for applying adhesives to signage for store shelving, and more particularly, to an improved apparatus and method for selectively applying unique adhesives onto sheets of multilayer substrates.

Some multilayer substrates currently being used for instore signage are 13.875"×13.33", but not limited to size, fully adhesive backed and include: top printable paper; permanent adhesive; polymer carrier; pressure sensitive adhesive; and a release liner. The pressure sensitive adhesive is added across the entire multilayer substrate and then cured to a level that attempts to balance the pressure sensitive properties with adhesive buildup issues. Adhesive buildup on rotary blades used to cut the multilayer substrates in X and Y directions into 18 2"×3" cards, or other size combinations, can occur in high volume requirements, for example, about every 2000 sheets. Currently, custom oiling systems are used in an attempt to keep the rotary blades lubricated to reduce adhesion of the adhesive to the blades. In addition, multiple cleaning operations are undertaken if shifts are employed. Unfortunately, both the oiling operation and cleaning requires operator intervention which leads to error in oil quantity, timing and damage to the blades during cleaning.

Therefore, there is a need for an improved apparatus and process for cutting polymer lined and fully backed adhesive signage stock for store shelving that reduces adhesion of pressure sensitive adhesive to rotary blades.

SUMMARY

Accordingly, an answer to this need is disclosed herein that includes a multilayer substrate pressure sensitive adhesives layout created by a dual system of adhesive rolls that allows the dual system to apply customized adhesive to two adhesive areas of card images positioned on the multilayer substrate: clear top edge adhesive of higher tackiness to attach the sign to store shelves; and backing adhesive for the printed display with each adhesive being cured differently.

BRIEF DESCRIPTION OF THE DRAWINGS

Various of the above-mentioned and further features and advantages will be apparent to those skilled in the art from the specific article or methods described in the example(s) below, and the claims. Thus, they will be better understood from this description of these specific embodiment(s), including the drawing figures (which are approximately to scale) wherein:

DETAILED DESCRIPTION OF THE PREFERRED EMBODIMENT

Figure 1:
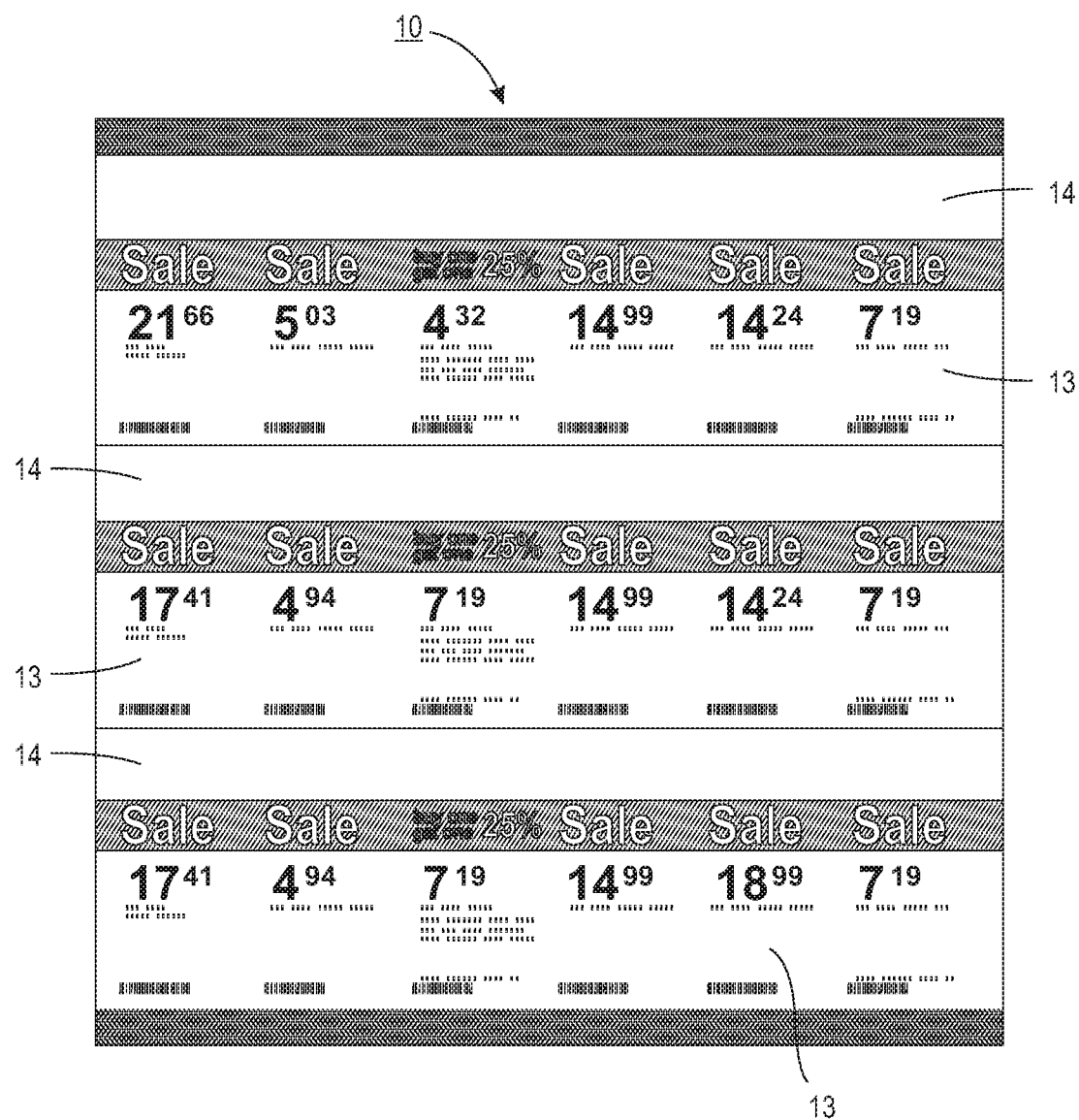
FIG. 1 is a front view of a polymer lined fully backed adhesive store signage multilayer substrate with indicia thereon.

For a general understanding of the features of the disclosure, reference is made to the drawings. In the drawings, like reference numerals have been used throughout to identify identical elements.

Figure 2:
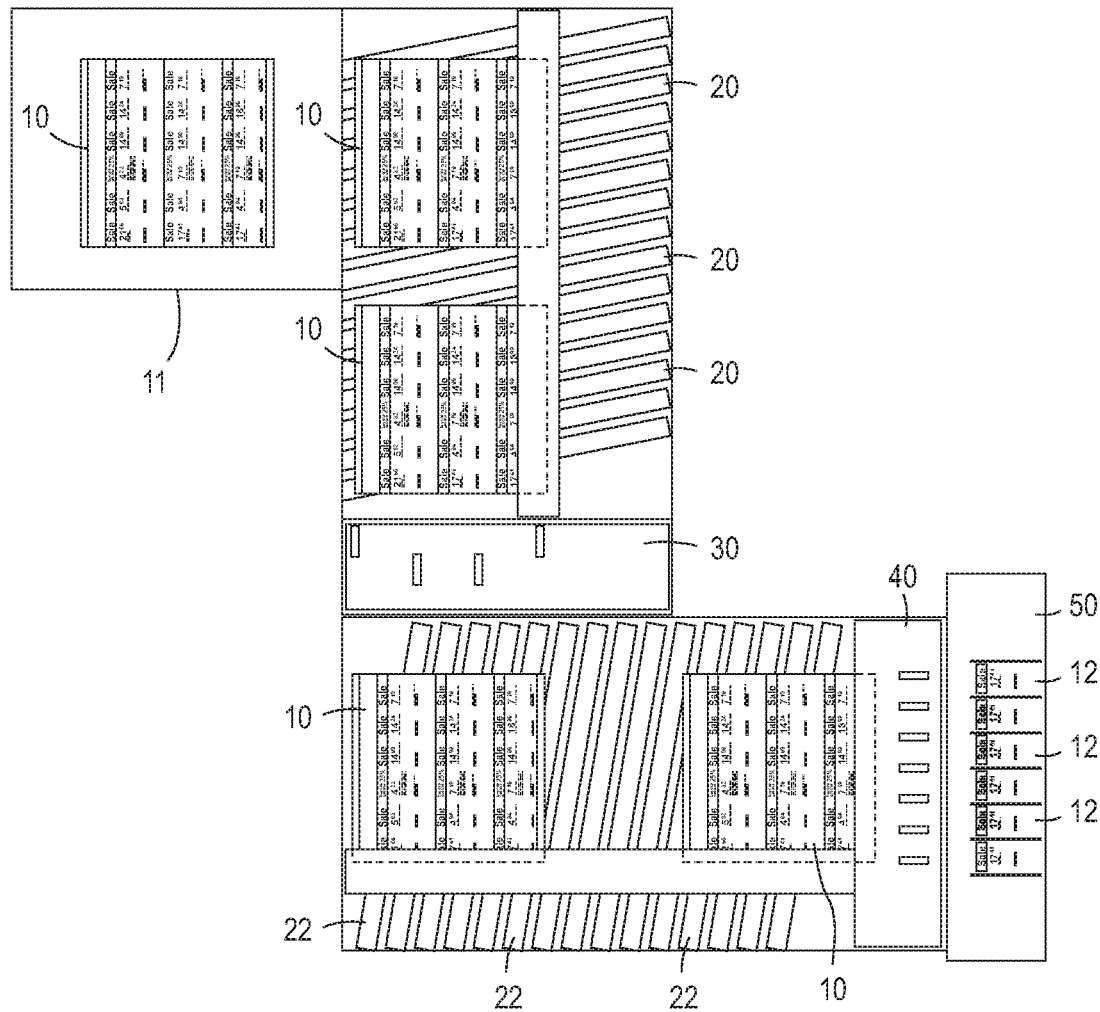
FIG. 2 is a plan view of an XY slitting system that slits multilayer substrates into individual cards.

In accordance with the present disclosure, a front view illustration of a multilayer substrate 10 is shown in FIG. 1 that includes paper 13 on which sales strip images of several cards are printed, a permanent adhesive (not shown), a clear polymer carrier 14 that adds strength to the substrate, a pressure sensitive adhesive (not shown) and a release liner (not shown). The sales strip images on paper 13 are configured to not extend into predetermined areas of clear polymer 14 in order to allow that portion of clear polymer 14 to be used for attaching to store shelving. The multilayer substrates 10 are cut into individual cards as shown in FIG. 2 where sheets 10 are conveyed from a conventional printer 11 onto a first table of cylindrical rollers 20 and into conventional cutter 30 that includes rotary blades that are moved into grooves in a stationary rotating member for engagement with substrate 10 of FIG. 1 orthogonal to a lengthwise dimension of the substrate. The substrates are then conveyed onto a second conveyor with cylindrical rollers 22 that conveys the substrates into a second conventional cutter 40 which includes stationary rotating blades positioned to extend into a groove in a mating member in order to cut through the bottom of the substrate 10 in-line with a lengthwise dimension of the substrate and the resulting separate cards 12 from the cutting are then forwarded into separate bins at collection station 50.

Figure 3:
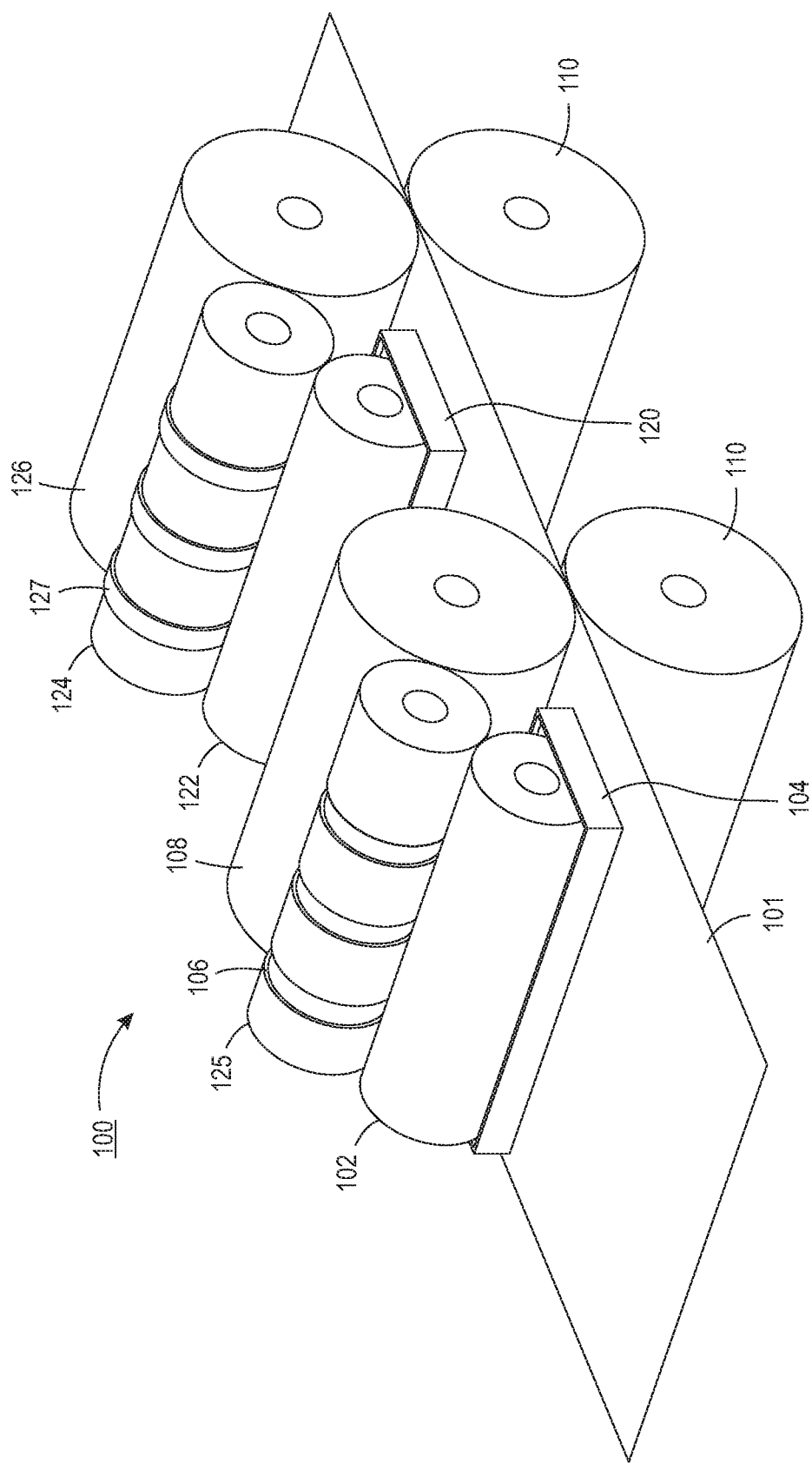
FIG. 3 is an isometric view of a dual tandem system in accordance with the present disclosure that applies two zones of differently cured pressure sensitive adhesives to multilayer substrates.

The configuration of multilayer substrate 10 in FIG. 1 reduces adhesion of pressure sensitive adhesive to rotary blades of cutters 30 and 40 by facilitating adhesives on the substrate to be customized across the substrate and to be optimized for individual functions. As shown in FIG. 3, a multiple pressure sensitive adhesive layout on multilayer substrate 101 is accomplished with a dual tandem system 100 that includes a metering roll 102 for applying sign backing adhesive from sump 104 onto donor roll 106 which is in contact with a transfer roll 108 that in turn applies the backing adhesive onto a web fed substrate 101. Transfer roll 108 is driven by drive rolls 110. Donor roll 106 applies a low tack adhesive to a portion of multilayer substrate 100 is a sign backing adhesive that will subsequently adhere to paper 13. Drive rolls 110 continue conveying multilayer substrate 101 into a second and high tack adhesive application that includes an adhesive sump 120 which presents a high tack adhesive to metering roll 122 that in turn deposits it onto a donor roll 124 that contacts transfer roll 126 for applying to portions (i.e., first or second portions) of substrate 101 that corresponds to clear top 14 portions of the multilayer substrates 10 in FIG. 1. Transfer rolls 108, 126 form a nip with drive rolls 110. The raised rings 125 and 127 on donor rolls 106 and 124, respectively, correspond to the width of paper portions 13 and clear polymer carrier portions 14 of individual cards positioned on multilayer substrates 10. First donor roll 106 includes multiple spaced and continuous raised rings 125 of a first width surrounding said first donor roll and corresponds to first portions of substrate or sheet 101 and second donor roll 124 includes multiple spaced and continuous raised rings 127 of a second width surrounding said second donor roll and corresponding to second portions of the sheet. Pressure sensitive adhesive of first portions of the first donor roll is different and non-overlapping with respect to pressure sensitive adhesive of the second portions of the second donor roll to provide applied first and second pressure sensitive adhesives non-overlapping on the sheet. The first pressure sensitive adhesive has adhesion that is different from the adhesion of said second pressure sensitive adhesive. Thus, an adhesive system is shown that uses a tandem system of donor rolls that allow for the application of differing adhesives to specific zones of continuous feed media 101 during a converting process. A converting process being the process of taking rolls of paper or other material and adding layers of other material to include multiple layers including adhesives and or liners. Further processes may also be included that remove or alter the roll to add lists, perforations or cut sheets from the roll. Each adhesive is then exposed to the appropriate curing process (i.e., air, heat, UV, etc.) to create multilayer substrate 10 that has two or more adhesive zones with varying cures and adhesive properties that facilitate differing adhesive properties across a substrate while limiting exposure of blades in cutters 30 and 40 to the high tacky adhesives.

In recapitulation, a method and apparatus for producing a dual pressure sensitive adhesive sheet for in-store signage having cards thereon that includes providing a clear top portion of each card with an adhesive that is cured to be tacky and flexible for adhesion to store shelves while the rest of the backer sheet has an adhesive that is cured to provide adhesion to the backer sheet, but does not require the flexible tackiness needed to hold a card to a shelf. A backer sheet often called the carrier can be a material such as PET—Polyethylene Terephthalate. This is the layer or sheet that allows for a permanent type adhesive on one side to attach the written label and for the pressure sensitive adhesive on the other side to a allow the label to adhere to a shelf and to hold the remaining release liner secure to carrier or backer. With this use of multiple adhesives, the cutting/slitting blades no longer have to cut through an entire sheet of highly tacky adhesive that quickly build up on the blades. The tacky adhesive can be applied and focused only on a small percentage of the entire sheet and only where that adhesive property is required. This reduces cutter blade exposure to tacky adhesives and proportionally reduces the adhesive buildup on the cutter blades, and thus, reduces cleaning and oiling requirements.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An apparatus for applying dual pressure sensitive adhesives to separate portions of a sheet, comprising:
    a sheet driven by drive rolls to receive different pressure sensitive adhesives onto either first or second portions thereof;
    a first sump having a first pressure sensitive adhesive therein;
    a first metering roll positioned to remove said first pressure sensitive adhesive from said first sump;
    a first transfer roll;
    a first donor roll including multiple spaced and continuous raised rings of a first width surrounding said first donor roll and corresponding to said first portions of said sheet positioned in contact with said first metering roll and said first transfer roll and adapted to transfer said first pressure sensitive adhesive from said first metering roll to said first transfer roll with said first transfer roll transferring said first pressure sensitive adhesive onto said first portions of said sheet;
    a second sump having a second pressure sensitive adhesive therein;
    a second metering roll positioned to remove said second pressure sensitive adhesive from said second sump;
    a second transfer roll; and
    a second donor roll including multiple spaced and continuous raised rings of a second width surrounding said second donor roll and corresponding to said second portions of said sheet positioned in contact with said second metering roll and said second transfer roll and adapted to transfer said second pressure sensitive adhesive from said second metering roll to said second transfer roll with said second transfer roll transferring said second pressure sensitive adhesive onto said second portions of said sheet wherein applied first and second pressure sensitive adhesives are non-overlapping on said sheet.

2. The apparatus of claim 1, wherein said pressure sensitive adhesive of said first portions of said first donor roll is different from said pressure sensitive adhesive of said second portions of said second donor roll.

3. The apparatus of claim 2, wherein said first pressure sensitive adhesive has adhesion that is different from the adhesion of said second pressure sensitive adhesive.

4. The apparatus of claim 2, wherein said first and second transfer rolls form a nip with said drive rolls.

* * * * *